Aug. 16, 1927.

E. P. RENAUX 1,639,149

COMPOUND BRAKE

Original Filed March 14, 1923

INVENTOR
EUGENE P. RENAUX
BY
ATTORNEY

Patented Aug. 16, 1927.

1,639,149

UNITED STATES PATENT OFFICE.

EUGÈNE PROSPER RENAUX, OF PARIS, FRANCE, ASSIGNOR TO BENDIX BRAKE COMPANY, OF CHICAGO, ILLINOIS, A CORPORATION OF ILLINOIS.

COMPOUND BRAKE.

Original application filed March 14, 1923, Serial No. 625,072. Divided and this application filed April 15, 1926. Serial No. 102,139.

This invention relates to brakes and is illustrated as embodied in a brake for an automobile wheel arranged to be applied by novel servo mechanism.

An object of the invention is to provide simple operating means through which a servo shoe engageable with the inside surface of the brake drum may contact the brake against the outside of the same drum. In one desirable arrangement, the servo shoe is relatively short and rigid and engages the inside surface of the drum opposite the unanchored ends of the external friction means, shown as a pair of anchored shoes, the servo shoe being arranged to engage and operate an arm extending inwardly from a contracting device arranged outside of the drum. Preferably the contracting device engages yokes on the ends of the shoes or the like to force them against the outside surface of the drum.

I prefer to use, to force the servo shoe against the inside of the drum, a pair of inter-connected spaced applying devices which may be operated by these brake-operating connections.

Figure 1:
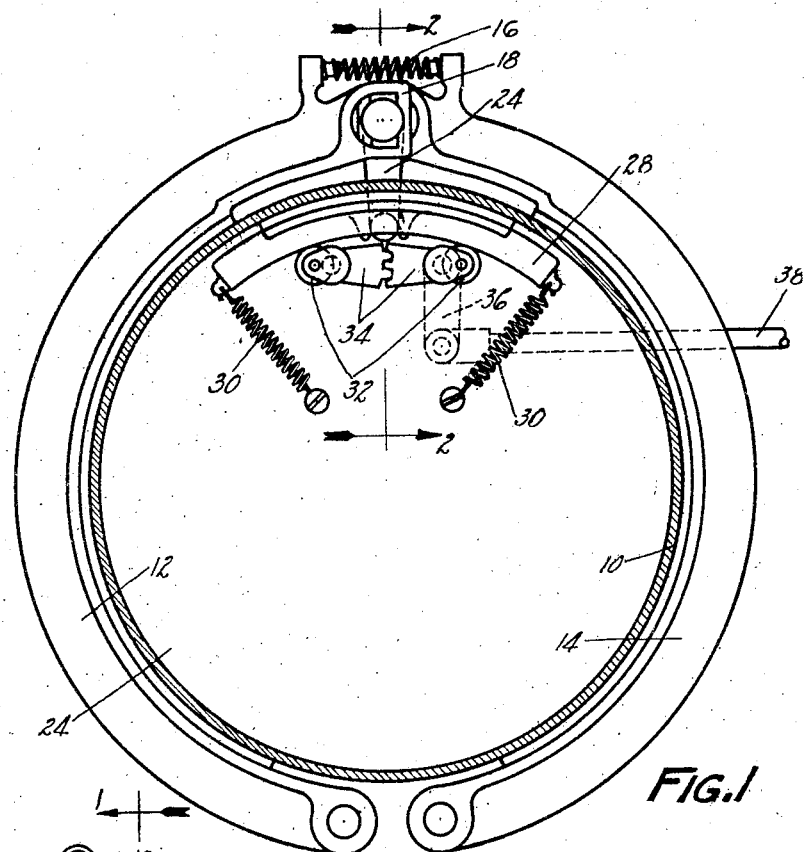
Figure 2:
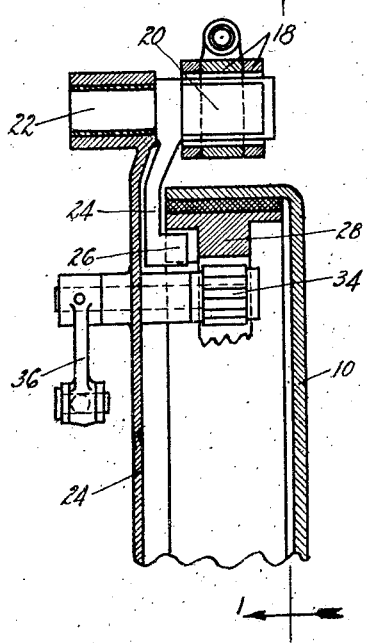

The advantages of this arrangement, and various additional features of novelty and desirable details of construction, will be apparent from the following description of one illustrative embodiment shown in the accompanying drawing, in which:

Figure 1 is a vertical section through the brake just inside the head of the brake drum, showing the brake shoes in side elevation; and Figure 2 is a partial vertical section on the line 2—2 of Figure 1, showing the means operated by the servo shoe for contracting the friction means against the outside of the drum.

The particular brake selected for illustration includes a drum 10 rotating with the wheel (not shown), about which is arranged suitable friction means such as a pair of semi-circular and substantially rigid shoes 12 and 14 anchored at the bottom of the drum and encircling the drum. At their free ends the shoes are urged apart by a compression spring 16 to hold them away from the brake drum, and they are formed with yokes 18 embracing contracting means such as a double cam 20 on a spindle 22 journalled in an outward extension of the backing plate 24 closing the open side of the drum 10. The cam or the like 20 is rocked to contract the friction means 12—14 by means of a lever or other part 24 secured to the spindle 22 and extending inwardly between the backing plate 24 and the drum 10. At its inner end the lever 24 is formed with a projection 26 extending into a notch approximately at the center of a servo shoe 28 which is preferably short and relatively rigid and which is engageable with the inner surface of the brake drum directly opposite the unanchored ends of the drums 12 and 14. The servo shoe 28 is arranged to be forced against the inside surface of the drum against the resistance of return springs 30 connected to its ends by means of a pair of spaced inter-connected novel applying devices shown as rollers 32 carried by crank arms having inter-meshing gear or rack segments 34. These rack segments or rollers are operated by an arm 36 connected to the usual brake-operating connections 38.

Whichever direction the servo shoe turns with the drum it will rock the arm 24 and therefore the cam 20 to contract the friction means 12—14 against the outside of the drum. When the brake is released the springs 30 urge the servo shoe 28 away from the inside surface of the drum while the spring 16 serves the double function of forcing the shoes 12 and 14 apart away from the drum and of acting through the cam 20 and lever 24 to return the servo shoe 28 to a central or initial position.

While one illustrative embodiment of my invention has been described in detail, it is not my intention to limit its scope to that particular embodiment or otherwise than by the terms of the appended claims. All of the subject-matter herein claimed is divided from my prior application No. 625,072, filed March 14, 1923.

I claim:

1. A brake comprising, in combination, a rotatable drum, a friction device encircling the drum and having adjacent movable ends formed with yokes, a contracting device embraced by the yokes and having an operating arm extending inside of the circumference of the brake drum, and a servo shoe engageable with the inside surface of the brake drum opposite said yokes and operating said arm to apply the friction device to the outside of the drum.

2. A brake comprising, in combination, a rotatable drum, a pair of substantially semi-circular brake shoes anchored at one side of the drum and substantially encircling the drum, a contracting device engaging the unanchored ends of the shoes and including an arm extending inside the circumference of the brake drum, and a relatively short rigid servo shoe engageable with the inside surface of the drum opposite the unanchored ends of the pair of shoes and engaging said arm to contract the pair of shoes against the drum.

3. A brake comprising, in combination, a rotatable drum, an external contracting friction device encircling the drum, contracting means for said device including an arm extending inside the circumference of the drum, a servo shoe operatively engaging said arm and engageable with the inner surface of the brake drum, and inter-connected spaced devices for forcing the servo shoe against the inside surface of the brake drum.

4. A brake comprising, in combination, a rotatable drum, an external contracting friction device encircling the drum, contracting means for said device including an arm extending inside the circumference of the drum, a servo shoe operatively engaging said arm and engageable with the inner surface of the brake drum, and inter-connected spaced rollers for forcing the servo shoe against the inside surface of the brake drum.

5. A brake comprising, in combination, a rotatable drum, a backing plate at the open side of the drum having a part extending outside of the circumference of the drum, an external contracting friction device encircling the drum, contracting means for the friction device supported on said part of the backing plate outside of the circumference of the drum and including an arm extending between the backing plate and the drum inside the circumference of the drum, and a servo shoe inside of the drum engaging said arm and engageable with the inside surface of the drum.

In testimony whereof, I have hereunto signed my name.

EUGÈNE PROSPER RENAUX.